US012437621B2

(12) United States Patent
Allen et al.

(10) Patent No.: US 12,437,621 B2

(45) **Date of Patent: *Oct. 7, 2025**

(54) SYSTEM AND METHOD FOR FOIL DETECTION USING MILLIMETER WAVE FOR RETAIL APPLICATIONS

(71) Applicant: Sensormatic Electronics, LLC, Boca Raton, FL (US)

(72) Inventors: John A. Allen, Pompano Beach, FL (US); Michael Del Busto, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,230

(22) Filed: Jun. 5, 2023

(65) Prior Publication Data

US 2023/0316885 A1 Oct. 5, 2023

Related U.S. Application Data

(63) Continuation of application No. 17/162,689, filed on Jan. 29, 2021, now Pat. No. 11,704,986.

(Continued)

(51) Int. Cl.
*G08B 13/24* (2006.01)

(52) U.S. Cl.
CPC ..... *G08B 13/2468* (2013.01); *G08B 13/2451* (2013.01)

(58) Field of Classification Search
CPC ............ G08B 13/2468; G08B 13/2451; G08B 13/248; G08B 13/2402; G08B 7/10366;
(Continued)

(56) References Cited

U.S. PATENT DOCUMENTS

| | | | |
|---|---|---|---|
| 3,486,374 | A | 12/1969 | Wright |
| 4,135,184 | A | 1/1979 | Pruzick |

(Continued)

FOREIGN PATENT DOCUMENTS

| | | | |
|---|---|---|---|
| AU | 639285 | B2 | 7/1993 |
| AU | 2013273749 | A1 | 1/2014 |

(Continued)

OTHER PUBLICATIONS

Communication pursuant to Article 94(3) EPC issued by the European Patent Office on Apr. 10, 2024.

(Continued)

*Primary Examiner* — Curtis A Kuntz
*Assistant Examiner* — Sharmin Akhter
(74) *Attorney, Agent, or Firm* — ArentFox Schiff LLP

(57) ABSTRACT

In an aspect, the present disclosure includes a system for detecting metal foil using millimeter wave (mmWave) for retail applications. The system comprises one or more pedestals positioned to define an exit portal leading to a point of exit, one or more security tag readers, fixedly positioned with the one or more pedestals, configured to read data from a security tag passing through the exit portal and one or more mmWave receivers, fixedly positioned near the point of exit, configured to receive one or more reflected mmWave beams from metal foil, wherein the detection of metal foil results in an alert message.

16 Claims, 3 Drawing Sheets

Related U.S. Application Data

(60) Provisional application No. 62/968,971, filed on Jan. 31, 2020.

(58) Field of Classification Search
CPC .............. G08B 7/0008; G08B 7/10009; G08B 19/0723; G08B 7/01; G06K 19/07749; G06K 2017/0041; G06K 19/0723; G06K 19/07716; H01Q 1/2225; H01Q 7/00; H01Q 1/22; H01Q 1/38
See application file for complete search history.

(56) References Cited

U.S. PATENT DOCUMENTS

| | | | | |
|---|---|---|---|---|
| 4,890,053 | A | 12/1989 | Banyasz et al. | |
| 6,025,780 | A | 2/2000 | Bowers et al. | |
| 6,188,310 | B1 | 2/2001 | Balch et al. | |
| 2005/0099302 | A1 | 5/2005 | Lieffort et al. | |
| 2005/0258975 | A1 | 11/2005 | Hunt | |
| 2007/0164865 | A1 | 7/2007 | Gaisson et al. | |
| 2008/0278320 | A1 | 11/2008 | Soto et al. | |
| 2008/0309491 | A1 | 12/2008 | Gillard et al. | |
| 2009/0174544 | A1 | 7/2009 | Allen et al. | |
| 2010/0277322 | A1 | 11/2010 | Eckert et al. | |
| 2011/0109455 | A1 | 5/2011 | Bergman et al. | |
| 2011/0109456 | A1 | 5/2011 | Bergman et al. | |
| 2011/0215928 | A1* | 9/2011 | Soto | G01V 3/10 340/572.1 |
| 2012/0092166 | A1 | 4/2012 | Allen et al. | |
| 2016/0049058 | A1 | 2/2016 | Allen et al. | |
| 2016/0180674 | A1 | 6/2016 | Hoehn et al. | |
| 2016/0187529 | A1 | 6/2016 | Chen et al. | |
| 2019/0164397 | A1 | 5/2019 | Pedersen | |

FOREIGN PATENT DOCUMENTS

| | | | | |
|---|---|---|---|---|
| EP | 0919971 | A2 | 6/1999 | |
| FR | 2740109 | A1 | 4/1997 | |
| IN | 201717007828 | A | 7/2017 | |
| JP | H0850690 | A | 2/1996 | |
| JP | H10-143773 | A | 5/1998 | |
| WO | 2004/104957 | A1 | 12/2004 | |
| WO | 2006081615 | A1 | 8/2006 | |
| WO | 2007/027827 | A2 | 3/2007 | |
| WO | WO-2012027317 | A1 * | 3/2012 | G01S 13/04 |
| WO | 2013/009169 | A1 | 1/2013 | |

OTHER PUBLICATIONS

International Search Report and Written Opinion received for PCT Patent Application No. PCT/US2021/015952, mailed on May 11, 2021, 18 pages.

* cited by examiner

SYSTEM AND METHOD FOR FOIL DETECTION USING MILLIMETER WAVE FOR RETAIL APPLICATIONS

CROSS-REFERENCE TO RELATED APPLICATIONS

The present application is a continuation application of U.S. patent application Ser. No. 17/162,689, which claims priority and the benefit of U.S. Provisional Application No. 62/968,971 filed on Jan. 31, 2020, both entitled “System and Method for Foil Detection using Millimeter Wave for Retail Applications,” the contents of which are hereby incorporated by reference in their entireties.

FIELD OF THE INVENTION

The present disclosure relates to retail applications and more particularly to metal foil detection using millimeter wave (mmWave) for retail applications.

BACKGROUND OF THE INVENTION

Radio frequency identification (RFID) systems and/or Electronic article surveillance (“EAS”) systems are commonly used in retail stores and other settings to prevent unauthorized removal of goods from a protected area. Typically, a detection system is configured at an exit from the protected area, which comprises one or more transmitters and antennas (“pedestals”) capable of generating an electromagnetic field across the exit, known as an “interrogation zone.” Articles to be protected are tagged with a security tag, e.g., an EAS tag (or marker) and/or an RFID tag that, when activated, generates a response signal when passed through the interrogation zone. An antenna and receiver in the same or another “pedestal” detects this response signal and may generate an alarm if the security tag has not been accounted for.

Acousto Magnetic (AM) systems are commonly used for EAS tag detection and are well known in the art. The detectors in an AM system emit periodic bursts at 58 kHz, which causes a detectable resonant response in an EAS tag. Similarly, detectors in an RFID system emit periodic bursts in the radio frequency range which causes a detectable resonant response in an RFID tag. There are “dual tech” tags which include an EAS tag and an RFID tag in an integrated tag or an integrated tag having EAS tag capabilities and RFID tag capabilities. The detectors in a dual tech system emit periodic bursts at 58 kHz and emit periodic bursts in the radio frequency range which causes detectable resonant responses by the dual tech tag.

Retailers (e.g., apparel retailers) have deployed security tags in stores to track product movements as they arrive at stores, are placed on display on the sales floor, and are sold. The security tags may be used with a security system to detect inventory changes and/or possible loss events. For example, security tags may be read by an exit system to determine whether a tagged item is exiting the retail location. A security tag can be read from up to several feet away and does not need to be within direct line-of-sight of the reader to be tracked.

To avoid detection of a security tag, a metal foil or a metal foil bag, also known as “booster bags,” may be used to shield detection of one or more security tags. For example, a thief may place merchandise in a booster bag and walk through an exit/pedestals without a security tag being detected due to the booster bag shielding the security tag from emitting a signal. In other words the booster bags shields AM and/or RFID frequencies from being detected by the pedestals.

Thus, there is a need in the art for detecting booster bags which may contain stolen merchandise from a store.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a system for detecting metal foil using millimeter wave (mmWave) for retail applications. The system comprises one or more pedestals positioned to define an exit portal leading to a point of exit, one or more security tag readers, fixedly positioned with the one or more pedestals, configured to read data from a security tag passing through the exit portal and one or more mmWave receivers, fixedly positioned near the point of exit, configured to receive one or more reflected mmWave beams from metal foil, wherein the detection of metal foil results in an alert message.

In a further example, a method for detecting metal foil using millimeter wave (mmWave) for retail applications is disclosed. In yet another aspect, a non-transitory computer-readable medium is provided including code executable by one or more processors for detecting metal foil using millimeter wave (mmWave) for retail applications is disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The present disclosure provides systems and methods for detecting metal foil bags. By incorporating mmWave technology into a pedestal or in an overhead detection system, the pedestal or overhead detection system may be able to detect a metal foil bag. For example, the pedestal or overhead detection system may transmits one or more mmWave beams and receives one or more reflected mmWave beams from a metal foil or metal foil bag. The reflected beam or reflected beams may trigger an alert. For example, the system may cause an alert message to be sent to a device associated with store personnel, such as a security guard. Thus, if merchandise having a security tag is placed in a booster bag, the mmWave technology is able to detect the booster bag and trigger an alert. The alert may be audible and/or be an alert message, e.g., email, text message and any other alert message that is received by a device, such as a computing device and/or mobile device. For example, a security guard may receive the alert and investigate the situation and discover stolen merchandise in a booster bag.

Figure 1:
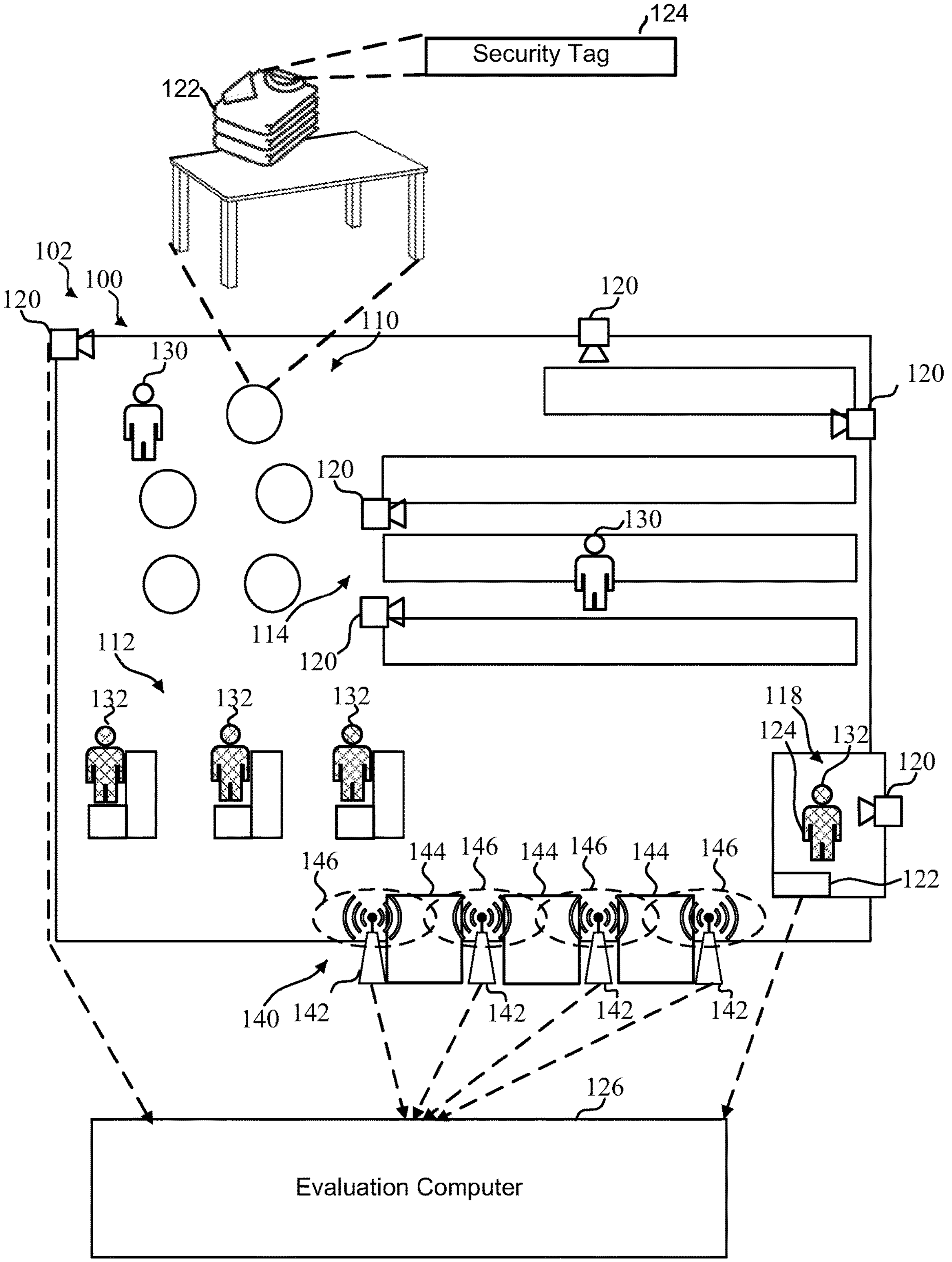
FIG. 1 is a schematic diagram of an example retail location including a first example of a security system.

Referring now to FIG. 1, an example retail location 100 includes multiple regions where tagged products may be located. For example, the retail location 100 may include an open display area 110, a front end 112, aisles 114, and a security room 118. Customers 130 may be located within the different regions or zones within the store and/or immediately outside the store. Workers 132 may be stationed at locations such as check out registers and the security room 118. A person of skill in the art would understand that the disclosed systems and methods are applicable to a variety of retail locations and the present disclosure is not limited to the example retail location or areas.

As discussed above, retailers (e.g., apparel retailers) have deployed security systems, such as EAS and/or RFID systems, in stores using security tags to track product movements, such as when the products arrive at a store, are placed on display on the sales floor, and/or are sold. By adopting security tags, retailers may be able to reduce the amount of time that the store employees spend counting the inventory (e.g., manually counting inventor that is on the floor and in stock room), as well as increase merchandise visibility within each store, thereby enabling shoppers in the store and online to find what they seek. Security systems may use different frequency signals to read and capture information stored on a tag attached to an object such as a good, product, or merchandise. For example, security tags may be used with a security system to detect inventory changes and/or possible loss events. For example, one or more security tags may be read by an exit system to determine whether a tagged item 122 is exiting the retail location. A security tag (e.g., tag 124) can be read from up to several feet away and does not need to be within direct line-of-sight of the reader to be tracked.

A security system may include one or more security tags or labels 124 (e.g., an EAS tag, RFID tag or dual tech tag) and a reader (e.g., exit system 140). Each security tag is embedded with at least one transmitter and at least one receiver, e.g., an EAS transmitter and EAS receiver, RFID transmitter and RFID receiver, or both. Each security tag may further contain the specific serial number for each specific object (e.g., an electronic product code (EPC)). For example, in one implementation, a security tag may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

To read the information encoded on a security tag 124, a two-way radio transmitter-receiver called an interrogator or reader (e.g., exit system 140) emits a signal to the security tag using one or more antennas, antenna panels or antenna arrays (e.g., internal antennas). The reader 140 may apply filtering to indicate what memory bank the security tag 124 should use to respond to the emitted signal. The security tag 124 may respond with the information (e.g., EPC value or serial number) written in the memory bank. The security tag data set may include any information stored on the security tag 124 as well as information about reading the security tag 124. For example, the security tag data set may include: a timestamp, a location, a signal transmission power, a received signal strength indication (RSSI), and an identifier of the reader 140. The security tag 124 may be a passive tag or a battery powered security tag. A passive security tag may use the interrogator or receiver's 140 wave energy to relay the stored information back to the interrogator. In contrast, a battery powered security tag 124 may be embedded with a battery that powers the relay of information.

The security system 102 may include an exit system 140, multiple cameras 120, and an evaluation computer 126. The exit system 140 may include multiple sensors 142 located near exits 144. The multiple sensors 142 may define an exit or point of exit. For example, the example retail location 100 may include three exits 144 that are relatively narrow. The sensors 142 may be located on each side of the exits 144. For example, in an implementation, the sensors 142 may include at least one security tag reader including an antenna that generates a tag detection field 146. Each security tag reader may be fixedly positioned with the sensor 142 or pedestal. For example, each security tag reader may be positioned or fastened to the sensor 142 or pedestal. Generally, the sensors 142 may be configured (e.g., by setting a power level) such that the tag detection fields 146 cover the exits 144 to detect tags moving through the exits. Although the sensors 142 are illustrated as pedestals adjacent the exits 144, sensors 142 may be located on the floor and/or the ceiling. As explained below in more detail, the sensors 142 may include mmWave technology to detect metal foil.

The cameras 120 may be located in or near the exit system 140 or may be located in other regions of retail location 100. Each camera 120 may be a digital video camera such as a security camera. The multiple cameras 120 may be located throughout the retail location 100. Each of the cameras 120 may provide a constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the security system 102 may move a camera 120 to maintain the field of view of the camera 120 on a customer 130. In another aspect, the security system 102 may allow manual control over one or more cameras 120. In an aspect, the security system 102 may be integrated with one or more other systems, and the video feed of the cameras 120 may be used for multiple purposes.

The evaluation computer 126 may be a computer device programmed to evaluate at least exit system measurements from the sensors 142. The evaluation computer 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing exist system measurements.

An exit system 140 may include a mmWave sensor 142 or mmWave technology. For example, the mmWave sensor 142 or mmWave technology may include a mmWave transmitter, a mmWave receiver and one or more antennas, antenna panels or antenna arrays. Each mmWave sensor 142 may be fixedly positioned with the pedestal. For example, mmWave sensor 142 may be positioned or fastened to the pedestal.

The mmWave transmitter may transmit one or more incident mmWave beams (e.g., at about 60 GHz) via the one or more antennas and receive one or more reflected mmWave beams via the one or more antennas. The one or more mmWave beams may be reflected off of a booster bag. The one or more reflected mmWave beams may be compared to a threshold to determine if a booster bag is detected. For example, the received signal strength of the one or more reflected mmWave beams is compared to a threshold to determine if a booster bag is detected. The comparison may be done at the pedestal (e.g., by a processor or a combination of hardware and software) and/or may be done by a processor of the evaluation computer 126. For example, a transceiver of the pedestal may transfer the one or more reflected mmWave beams to the evaluation computer 126 via a wired or wireless communication link for processing.

In one implementation, the mmWave sensor 142 may compare the amplitudes, phases, frequencies, and/or frequency shifts of the one or more incident mmWave beams, and the amplitudes, phases, frequencies, and/or frequency shifts of the one or more reflected mmWave beams. The mmWave sensor 142, which may include mmWave transmitters and/or receivers, may determine the presence of metal foil based on the differences/changes of the amplitudes, phases, frequencies, and/or frequency shifts of the one or more incident mmWave beams and/or the one or more reflected mmWave beams. For example, the mmWave sensor 142 may evaluate the received signal strength of the received signal strength of the one or more reflected mmWave beams to determine the presence of metal foil. If the received signal strength is, for example, larger than a threshold strength value, the mmWave sensor 142 may determine the presence of metal foil. If the received signal strength is, for example, smaller than the threshold strength value, the mmWave sensor 142 may determine that there is no metal foil.

In one or more embodiments, the camera 120 may include a mmWave sensor 142 and perform similar functions as described above. In one or more embodiments, a sensor system, overhead system or antenna system may include a mmWave sensor 142, e.g., a mmWave transmitter, a mmWave receiver and one or more antennas and perform similar functions as described above. The sensor system, overhead system or antenna system may be mounted in the store in a similar manner as the cameras 120.

The mmWave technology or mmWave sensor 142 may be used for people counting, backfield control and/or RFID filtering of reads already. For people counting, the mmWave technology may be used to count how many people enter and leave the store and/or how many people enter or leave a zone or area within the store. For example, a mmWave transmitter may transmit one or more mmWave beams and a mmWave receiver may receive one or more reflected mmWave beams. The one or more reflected mmWave beams may be compared to a threshold (e.g., received signal strength) to a threshold to determine if a person entered or left a zone or the store.

Backfield control allows a store to place merchandise closer to the sensors. For example, a pedestal or overhead detection system (or antenna system) may detect one or more security tags and the mmWave technology may be used to identify if the one or more security tags are with or associated with a person (e.g., moving) or remain stationary. If the mmWave technology detects that the one or more security tags are stationary, then no alert message would result. However, if the mmWave technology detects that the one or more security tags is moving, then another determination may be used to determine if the one or more security tags is within an alert zone to trigger an alert message. For example, the evaluation computer 126 may receive information from the pedestal or overhead detection system and determine if the one or more security tags are moving towards an exit or alert zone (e.g., within a predetermined threshold of an exit) and trigger an alert message.

RFID filtering of reads already allows a store to determine if a reading of an RFID tag is a reflected signal or not. Due to the nature of radio frequencies, a resonant response from an RFID tag may be triggered from a reflected RFID burst off an object or objects or the resonant response is reflected off of an object or objects and may result in a false reading. For example, a radio frequency signal may reflect off of a human or another object. The unintended resonant response may be determined to be an unintended signal by using the mmWave technology as discussed above regarding the backfield control.

Figure 2:
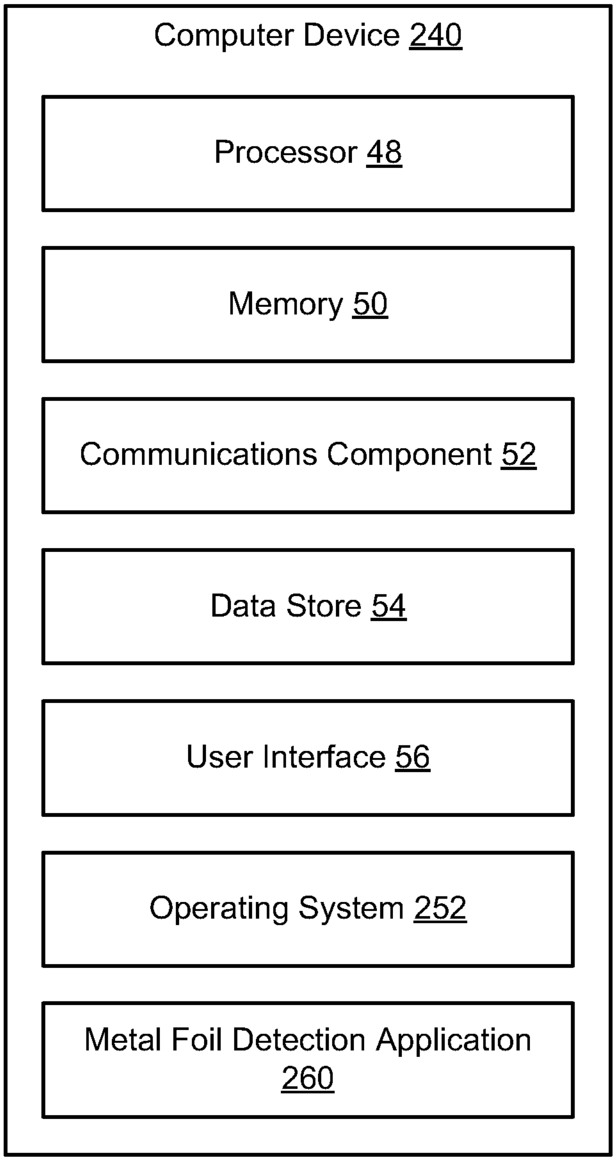
FIG. 2 is a schematic block diagram of an example computer device, in accordance with an implementation of the present disclosure.

Referring now to FIG. 2, illustrated is an example computer device 240 in accordance with an implementation, including additional component details as compared to FIG. 1. The computer device 240 may be an example of the evaluation computer 126 of FIG. 1. In one example, computer device 240 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 242.

In an example, computer device 240 may include memory 50 for storing instructions executable by the processor 48 for carrying out the functions described herein. In an implementation, for example, memory 50 may include memory 244. The memory 50 may include instructions for executing a metal foil detection application 260 for executing the methods.

Further, computer device 240 may include a communications component 52 that provides for establishing and maintaining communications with one or more parties utilizing hardware, software, and services as described herein. Communications component 52 may carry communications between components on computer device 240, as well as between computer device 240 and external devices, such as devices located across a communications network and/or devices serially or locally connected to computer device 240. For example, communications component 52 may include one or more buses, and may further include transmit chain components and receive chain components associated with a transmitter and receiver, respectively, operable for interfacing with external devices.

Additionally, computer device 240 may include a data store 54, which can be any suitable combination of hardware and/or software, that provides for mass storage of information, databases, and programs employed in connection with implementations described herein. For example, data store 54 may be a data repository for operating system 252 and/or metal foil defection application 260. The data store may include memory 244 and/or storage device 246.

Computer device 240 may also include a user interface component 56 operable to receive inputs from a user of computer device 240 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 252 and/or metal foil defection application 260. In addition, processor 48 may execute operating system 252 and/or metal foil defection application 260, and memory 50 or data store 54 may store them.

Figure 3:
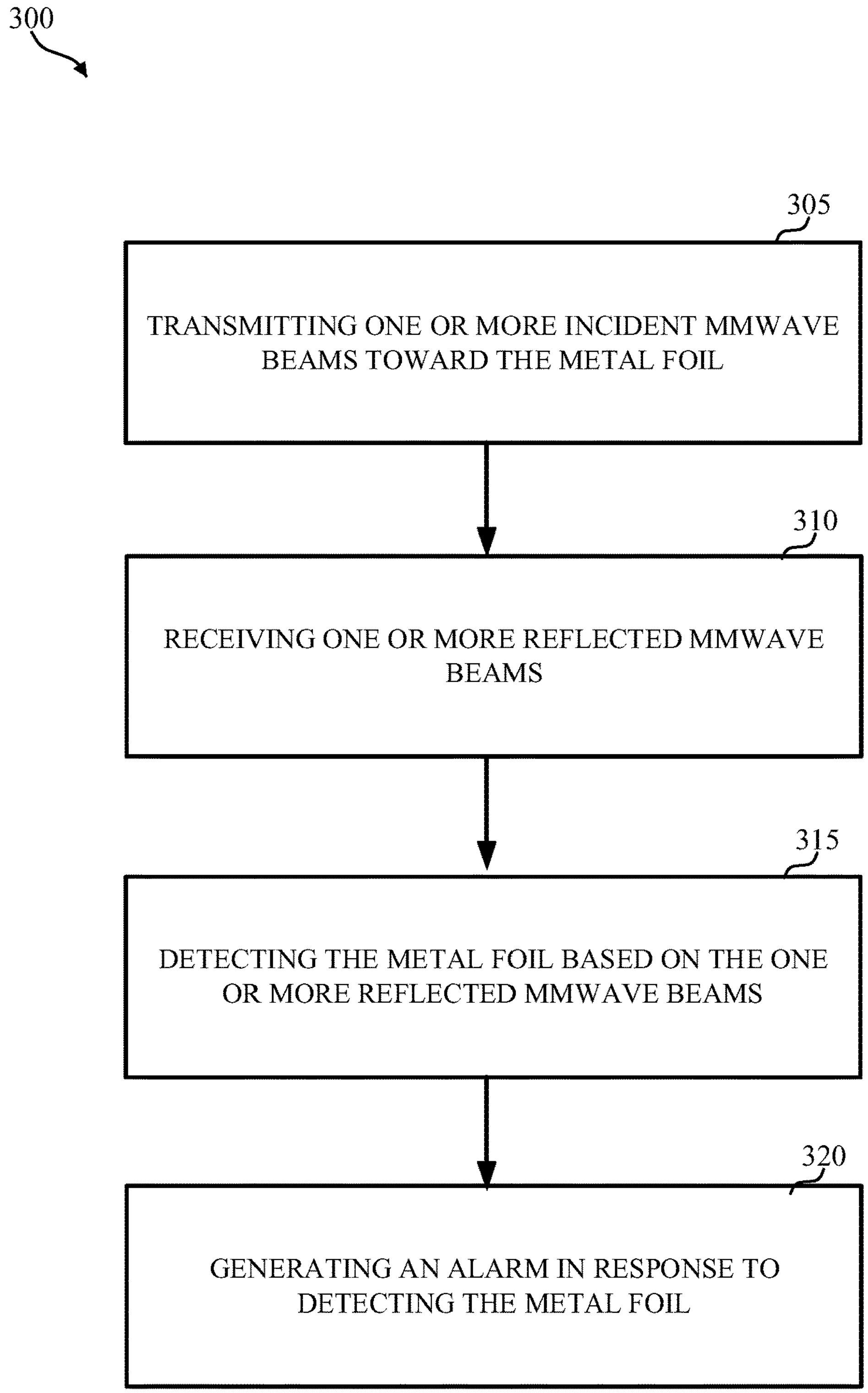
FIG. 3 is a flow diagram of a method for detecting foil, in accordance with an implementation of the present disclosure.

Turning to FIG. 3, a method of 300 detecting metal foil may be performed by the evaluation computer 126, the mmWave sensor 142, and/or the computing device 240.

At block 305, the method 300 may transmit one or more incident mmWave beams toward the metal foil. For example, the evaluation computer 126, the mmWave sensor 142, the one or more mmWave transmitters, and/or the computing device 240 may transmit one or more incident mmWave beams toward the metal foil.

At block 310, the method 300 may receive one or more reflected mmWave beams. For example, the evaluation computer 126, the mmWave sensor 142, the one or more mmWave transmitters, and/or the computing device 240 may receive one or more reflected mmWave beams.

At block 315, the method 300 may detect the metal foil based on the one or more reflected mmWave beams. For example, the evaluation computer 126, the mmWave sensor 142, and/or the computing device 240 may detect the metal foil based on the one or more reflected mmWave beams as discussed above. In one implementation, the mmWave sensor 142 may compare the amplitudes, phases, frequencies, and/or frequency shifts of the one or more incident mmWave beams, and the amplitudes, phases, frequencies, and/or frequency shifts of the one or more reflected mmWave beams. The mmWave sensor 142, which may include mmWave transmitters and/or receivers, may determine the presence of metal foil based on the differences/changes of the amplitudes, phases, frequencies, and/or frequency shifts of the one or more incident mmWave beams and/or the one or more reflected mmWave beams. For example, the mmWave sensor 142 may evaluate the received signal strength of the received signal strength of the one or more reflected mmWave beams to determine the presence of metal foil. If the received signal strength is, for example, larger than a threshold strength value, the mmWave sensor 142 may determine the presence of metal foil. If the received signal strength is, for example, smaller than the threshold strength value, the mmWave sensor 142 may determine that there is no metal foil.

At block 320, the method 300 may generate an alarm in response to detecting the metal foil. For example, the evaluation computer 126, the mmWave sensor 142, and/or the computing device 240 may generate an alarm in response to detecting the metal foil.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A system for detecting metal foil using millimeter wave (mmWave) for retail applications, comprising:
- one or more pedestals positioned to define an exit portal leading to a point of exit;
- one or more security tag readers, fixedly positioned with the one or more pedestals, configured to read data from a security tag approaching the exit portal; and
- one or more mmWave receivers, fixedly positioned near the point of exit, configured to receive one or more reflected mm Wave beams from metal foil, wherein the one or more mm Wave receivers is further configured to detect the metal foil based on receiver frequencies of the one or more reflected mmWave beams without receiver phases of the one or more reflected mmWave beams, wherein the detection of metal foil results in an alert message.

2. The system of claim 1, further comprising one or more mmWave transmitters configured to transmit one or more incident mm Wave beams toward the metal foil.

3. The system of claim 2, wherein the one or more mmWave receivers is further configured to compare the one or more incident mmWave beams and the one or more reflected mmWave beams.

4. The system of claim 3, wherein comparing comprises comparing at least one of transmitter frequencies or transmitter frequency shifts of the one or more incident mmWave beams and at least one of receiver frequencies or receiver frequency shifts of the one or more reflected mm Wave beams.

5. The system of claim 1, wherein the one or more mmWave receivers is further configured to detect the metal foil based on a received signal strength of the one or more reflected mm Wave beams.

6. The system of claim 5, wherein detecting the metal foil comprises:
- comparing the received signal strength to a threshold; and
- generating the alarm message in response to the received signal strength being larger than the threshold.

7. A method of detecting metal foil, comprising:
- transmitting one or more incident mm Wave beams toward the metal foil;
- receiving one or more reflected mmWave beams;
- detecting the metal foil based on receiver frequencies of the one or more reflected mm Wave beams without receiver phases of the one or more reflected mmWave beams; and
- generating an alarm in response to detecting the metal foil.

8. The method of claim 7, wherein detecting the metal foil further comprises comparing the one or more incident mmWave beams and the one or more reflected mmWave beams.

9. The method of claim 8, wherein comparing further comprises comparing at least one of transmitter frequencies or transmitter frequency shifts of the one or more incident mm Wave beams and at least one of receiver frequencies or receiver frequency shifts of the one or more reflected mm Wave beams.

10. The method of claim 7, wherein detecting the metal foil comprises detecting the metal foil based on a received signal strength of the one or more reflected mm Wave beams.

11. The method of claim 10, wherein detecting the metal foil further comprises comparing the received signal strength to a threshold.

12. A non-transitory computer readable medium comprising instructions that, when executed by one or more processors, cause the one or more processors to:
- cause one or more mmWave transmitters to transmit one or more incident mm Wave beams toward the metal foil;
- cause one or more mmWave receivers to receive one or more reflected mmWave beams;
- detect metal foil based on receiver frequencies of the one or more reflected mmWave beams without receiver phases of the one or more reflected mm Wave beams; and
- generate an alarm in response to detecting the metal foil.

13. The non-transitory computer readable medium of claim 12, wherein the instructions for detecting the metal foil further comprises instructions for comparing the one or more incident mmWave beams and the one or more reflected mmWave beams.

14. The non-transitory computer readable medium of claim 13, wherein the instructions for comparing further comprises instructions for comparing at least one of transmitter frequencies or transmitter frequency shifts of the one or more incident mm Wave beams and at least one of receiver frequencies or receiver frequency shifts of the one or more reflected mmWave beams.

15. The non-transitory computer readable medium of claim 12, wherein the instructions for detecting the metal foil comprises instructions for detecting the metal foil based on a received signal strength of the one or more reflected mmWave beams.

16. The non-transitory computer readable medium of claim 15, wherein the instructions for detecting the metal foil further comprises instructions for comparing the received signal strength to a threshold.

* * * * *